UNITED STATES PATENT OFFICE.

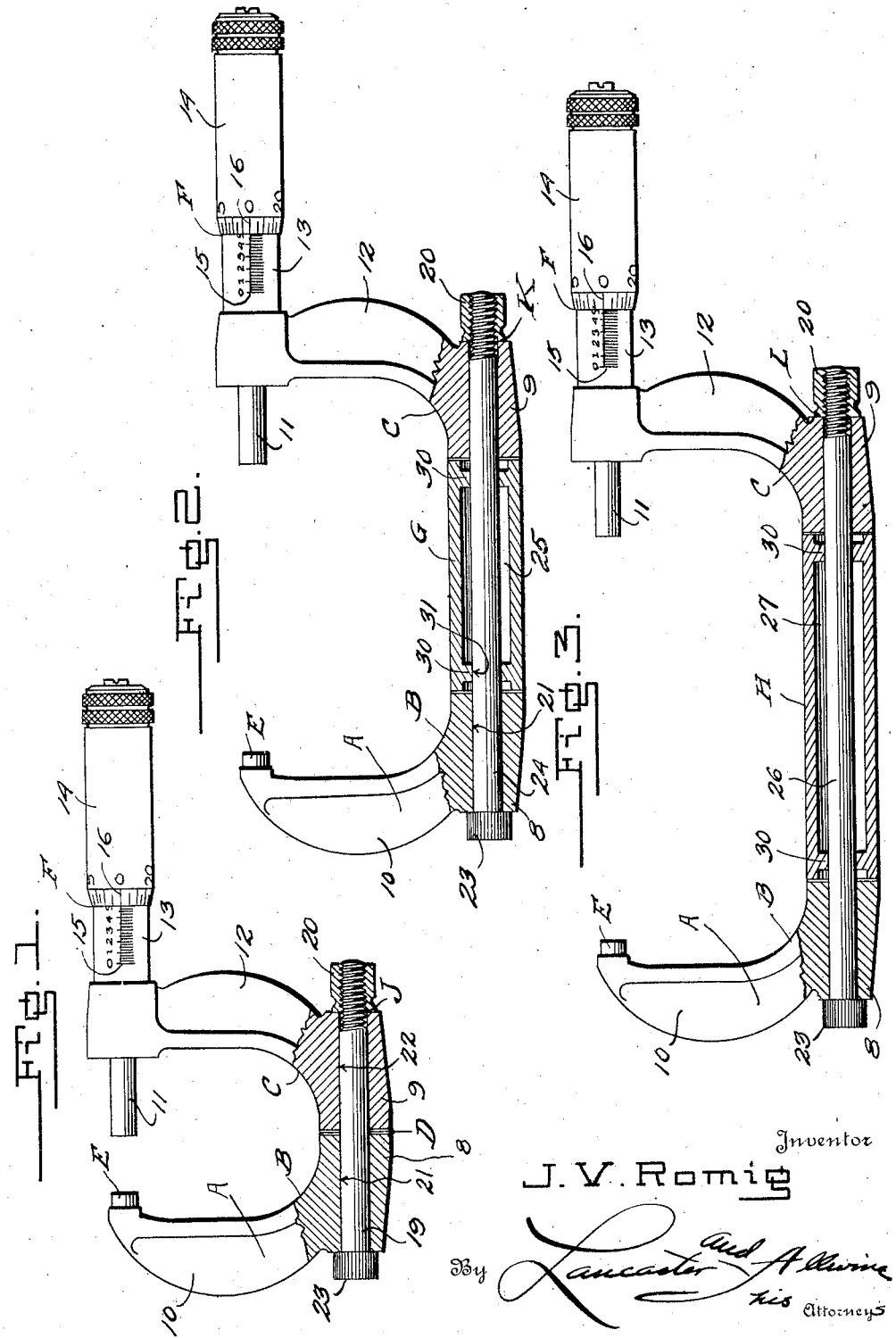

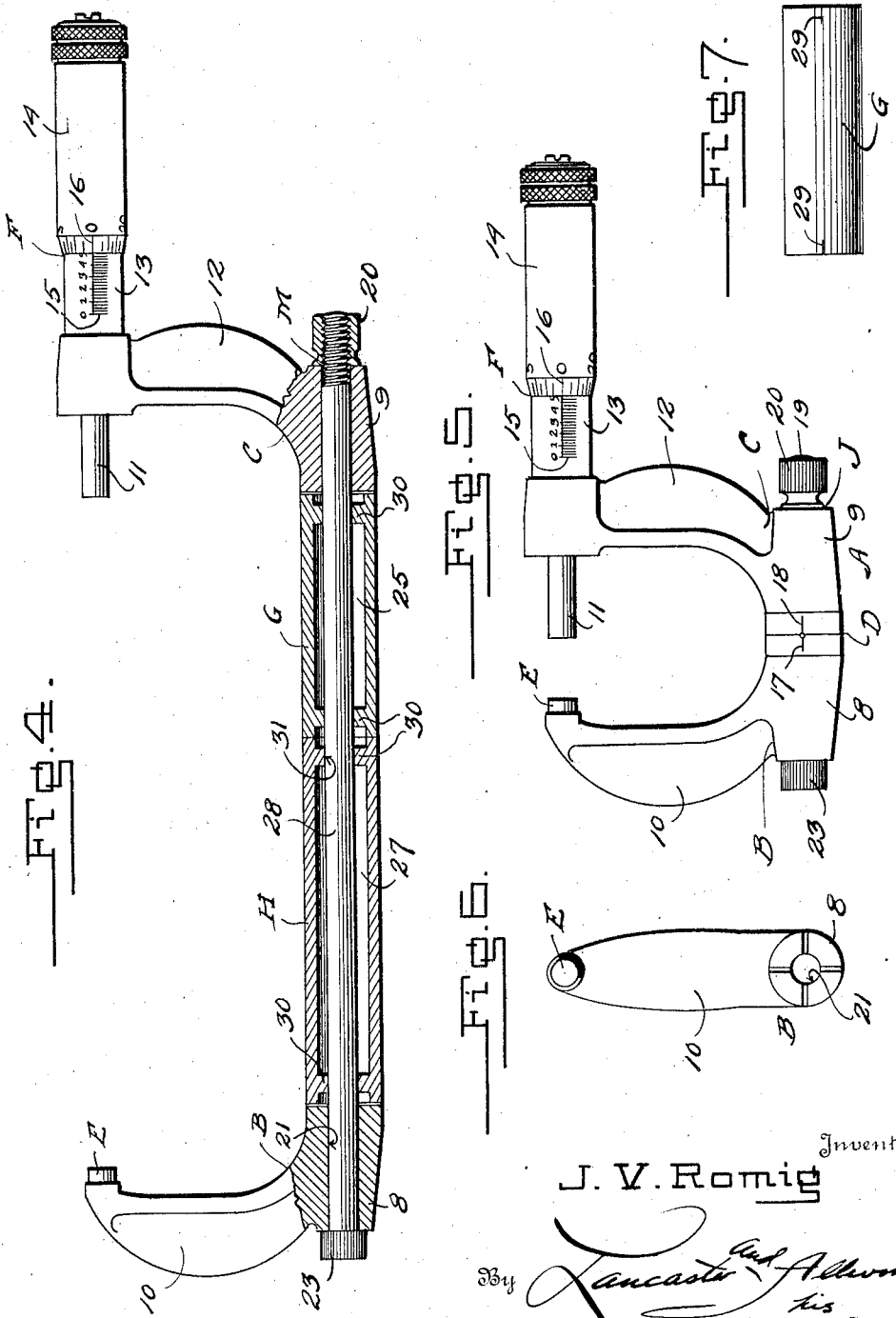

JOSEPH V. ROMIG, OF ALLENTOWN, PENNSYLVANIA.

COMBINATION MICROMETER-CALIPER.

1,361,406.     Specification of Letters Patent.     Patented Dec. 7, 1920.

Application filed July 22, 1919. Serial No. 312,471.

*To all whom it may concern:*

Be it known that I, JOSEPH V. ROMIG, a citizen of the United States, residing at Allentown, in the county of Lehigh and State of Pennsylvania, have invented certain new and useful Improvements in Combination Micrometer-Calipers, of which the following is a specification.

My present invention relates to precision measuring instruments and more particularly to micrometer calipers.

The principal objects of my invention are first, to provide a micrometer caliper which may be adapted for use in measuring a fraction of a unit of measurement, such as a fraction of an inch, or a measurement equal to a unit, or a plurality of units either with or without a fraction of a unit, with the instrument very compact, thus enabling a machinist to adapt the instrument to his particular needs to take measurements from say .001 inch to six inches or any fraction therebetween, but rendering the instrument more compact if the range desired is say, four, three, two or one inch as the maximum unit or units and avoid the necessity of a plurality of micrometers for taking measurements of this nature; second, to provide a combination micrometer caliper comprising a divided frame, one section of which may be termed the anvil section, and the other, the micrometer section, a plurality of spacing elements of different lengths, and means for clamping one or more of the spacing elements between the frame sections, the spacing elements being so formed that if the clamping means become worn in use, they may be replaced without discarding the spacing elements.

Other objects and advantages of the invention will appear in the following detailed description, taken in connection with the accompanying drawings, forming a part of this specification, and in which drawings:

Figure 1 is a view partly in elevation and partly in longitudinal section of micrometer calipers constructed according to my invention, and in the example shown being adapted for taking measurements of a unit, such as an inch, or a fraction thereof.

Fig. 2 is a similar view disclosing a spacing element between the frame members to adapt the calipers for measurement of a plurality of units, or fraction thereof.

Fig. 3 is a similar view showing a relatively larger spacing element.

Fig. 4 is a similar view showing a plurality of coöperating spacing elements.

Fig. 5 is an elevation of the micrometer calipers as shown in Fig. 1 of the drawings.

Fig. 6 is an inside end elevation of one of the frame sections.

Fig. 7 is a side elevation of one of the spacing elements.

In the drawings, where similar characters refer to similar parts throughout the several views, A designates generally the frame including sections B and C divided as at the line D; E an anvil carried by section B; F a micrometer carried by section C; G, and H, spacing elements of different lengths; J, means for clamping the sections B and C together; K, means for clamping spacing element G between the frame sections; L, means for clamping element H between the frame sections; and M, means for clamping spacing elements G and H between the frame sections.

The frame A, may be in general appearance similar to the frame of micrometer calipers now in common use, with the exception that it is divided as hereinbefore set forth, as at the line D and section B is provided with an enlarged base 8 adapted to abut base 9 of section C, with arm 10 of section D carrying anvil E in confronting relation to a movable spindle 11 of micrometer F, which micrometer is carried by arm 12 of section C. In the example shown, the anvil E is set in spaced relation to a plane common to the engaging faces of bases 8 and 9, while the spindle 11 has an amplitude of movement from the face of anvil E, equal to a unit of measurement, such as one inch, so that when the two frame sections are clamped together with their bases abutting, the micrometer may be used for measuring a unit or a fraction of a unit of measurement.

The micrometer F may be of any suitable type, including the spindle 11, sleeve 13, and thimble 14, each provided with graduations 15 and 16 respectively in the usual manner, and suitable mechanism, not shown in the drawings, for moving the spindle 11 when rotation is manually imparted to the thimble 14. The frame sections B and C may be provided with indicators 17 and 18, respectively, adapted to aline, as clearly shown in Fig. 5 of the drawing, when the end of spindle 11 is in confronting relation to anvil E.

In order to retain the frame sections in operative relation one to the other, means J is provided which may comprise a bolt 19 and nut 20, the shank of the bolt extending through ways or bores 21 and 22, in bases 8 and 9 respectively, with the head 23 of bolt 19 engaging the end portion of one of the bases, and the nut 20 turned tight against the end portion of the other base, as clearly shown in Fig. 1 of the drawings.

In order to adapt the micrometer caliper for use in measuring a length greater than a unit or fraction thereof, spacing elements G and H are provided, differing in length, and while in the example shown, merely two of such spacing elements are shown, it is to be understood that any number may be provided to be used singly or combined, and that these spacing elements may be of any predetermined length or lengths. In the example shown, the spacing element G is relatively shorter than the spacing element H and is, by way of example, in length equal to two units of measurement, such as two inches, while the spacing element H is three units or three inches. Thus, by way of example, if it is desired to measure a distance up to and including three inches, spacing element G may be disposed between the frame sections B and C, and retained in place by means K similar to means J, with the exception that the stem 24 extends through a bore 25, of the spacing element in addition to bores 21 and 22. If by way of example it is desired to measure lengths up to and including four inches, spacing element H may be disposed between the frame sections B and C and the means L is similar to means J with the exception that the stem 26 of the bolt is relatively longer and passes through a bore 27 of spacing element H. A plurality of these spacing elements may be combined, as shown in Fig. 4 of the drawings, where it is desired to measure a length greater than is possible by the use of merely one of the spacing elements, and under which conditions, the means M is similar to means J with the exception that the stem 28 of the bolt extends not only through the bores 21 and 22 of the frame sections, but also through the bores 25 and 27 of the spacing elements G and H respectively, in the example shown. The spacing elements may be provided with indicators 29 adapted to be alined with the indicators 17 and 18 when disposed between the frame sections B and C, with the end of spindle 11 confronting the anvil E.

The faces of the bases 8 and 9 and the spacing elements are accurately ground in relation to one another so as to make a perfect joint when the indicators are in alinement with one another.

In order to render the spacing elements G and H relatively light in weight, yet rigid throughout their length, it is preferred to form the bores 25 and 27 relatively larger than the bores 21 and 22, the spacing elements being provided with annular ribs 30, in spaced relation, adjacent the ends of the spacing elements, and extending from the wall of the bore of the element, and having a way 31 of substantially the same diameter as the bores 21 and 22, so that the bolts of the clamping means is in engagement with these ribs, so as to retain the spacing elements in axial alinement with the bores 21 and 22.

It is to be observed that the machinist may adapt the micrometer calipers to his particular needs and where measurements to be taken do not exceed a unit, such as one inch, the spacing elements may be dispensed with, so as to render the tool compact, as shown in Figs. 1 and 5 of the drawings, but where there are to be measurements greater than the unit, but less than three or four units of measurement, a spacing element may be selected accordingly, so that the length of the instrument will be no greater than necessary in order to accomplish the object in view. The micrometer caliper may be used for measuring diameters, limited only by the length of the arms 10 and 12, in the example shown, diameters up to three inches, but may be used for measuring lengths of relatively flat members up to six inches, in the example shown, by the combination of spacing elements G and H.

It is further to be observed that if through use the threads of the bolts become worn, mutilated, or otherwise rendered unsatisfactory for use, they may be discarded, without discarding the spacing element, there being practically no wear of the same in use.

Changes in details or substitution of equivalents may be made without departing from the spirit or scope of my invention, but;

I claim:

In a micrometer caliper, the combination of an anvil, a micrometer including a movable spindle, a divided frame one section of which carries said anvil and the other said micrometer, said sections each provided with a bore, and said bores adapted to axially aline with the end of said spindle confronting said anvil, a spacing element disposed between said frame sections, said spacing element having a bore axially alined with the bores of said frame sections, but relatively larger in diameter than the same, and provided with spaced annular ribs adjacent its ends extending from the wall of said bore and having a way of substantially the same diameter as the bores of said frame sections, a bolt extending through said bores of said frame and spacing element and engaging said ribs, and a nut on said bolt.

JOSEPH V. ROMIG.